United States Patent

[11] 3,589,702

| [72] | Inventors | Rudolf Spieth |
| | | Plochingerstrasse 156, Esslingen; |
| | | Gunter Otto, Linderstrasse 3, Altbach, both |
| | | of, Germany |
| [21] | Appl. No. | 775,416 |
| [22] | Filed | Nov. 13, 1968 |
| [45] | Patented | June 29, 1971 |
| [32] | Priority | Oct. 1, 1968 |
| [33] | | Germany |
| [31] | | P 18 00 096.9 |

[54] GAS SPRINGS
7 Claims, 3 Drawing Figs.

| [52] | U.S. Cl. | 267/64 |
| [51] | Int. Cl. | F16f 5/00 |
| [50] | Field of Search | 269/64, 64 A, 65, 65 A |

[56] References Cited
UNITED STATES PATENTS

| 2,946,582 | 7/1960 | Martin | 267/64 |
| 3,224,751 | 12/1965 | Andrews | 267/64 |

*Primary Examiner*—James B. Marbert
*Attorney*—Stevens, Davis, Miller & Mosher

ABSTRACT: An improved gas spring with a volume of pressure gas, comprising a cylinder and, arranged therein, an axially displaceable displacement rod, passing sealingly towards the outside through one end of the cylinder, wherein the spring characteristic is variable as a function of the stroke of the displacement rod. Preferably, the displacement rod comprises an inner rod and an axially displaceable sleeve, surrounding the same.

A second outer cylinder may be arranged concentrically about the cylinder in spaced relationship therefrom, the annular space between the said cylinders being filled partly with pressure gas, whilst the other part of the said annular space and the whole interior of the said inner cylinder are filled with a liquid and wherein the interior rod is connected with a piston equipped with restricting passages.

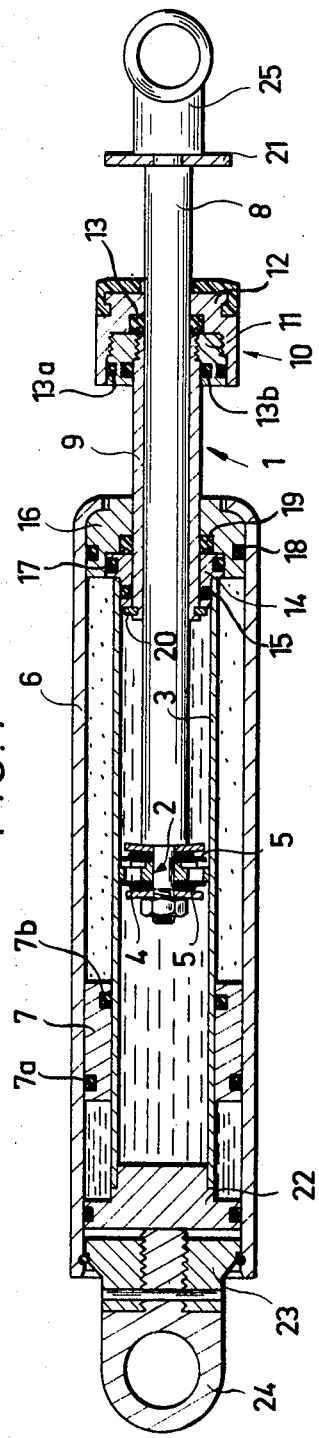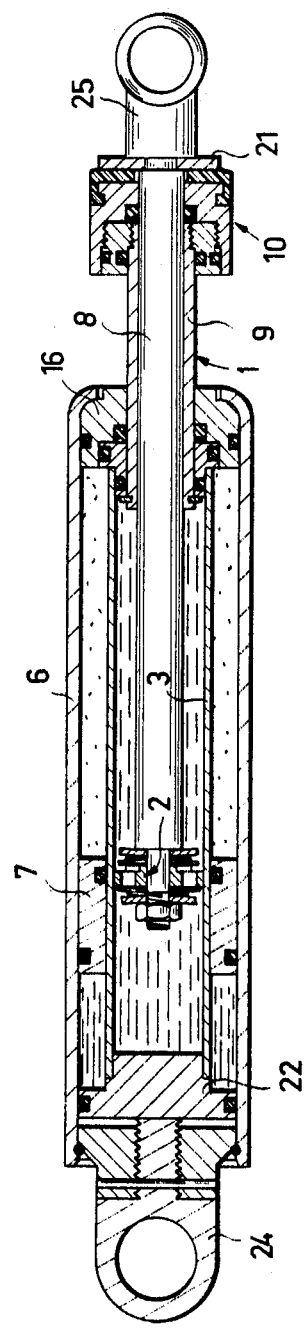

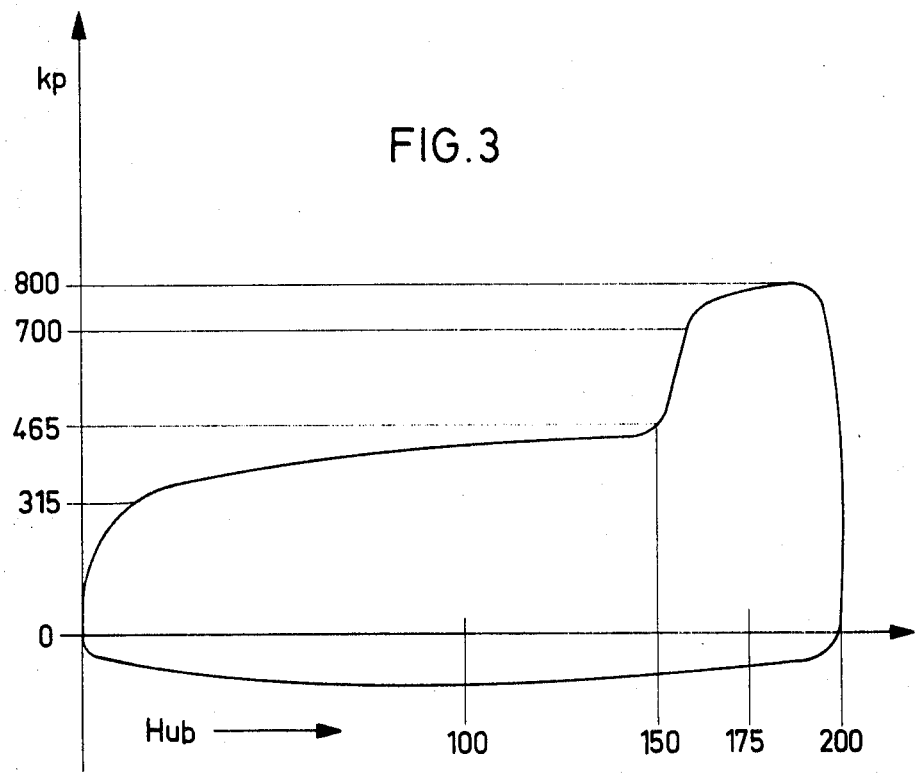

GAS SPRINGS

The invention relates to a gas spring with a piston rod arranged axially displaceably within a cylinder and passing in sealing engagement through one end of the cylinder.

Gas spring of this type are known in the art; they have the disadvantage that, with a given charge of pressure gas and a given cross section of the piston rod, the spring characteristic is constant and cannot be adapted to changing conditions. However, the requirement of a variation of the spring characteristics exists in many cases, particularly where gas springs are used in the suspension of mechanically propelled vehicles. In this application, it is of great advantage to vary the spring characteristics so that the spring is harder at the end of the stroke. This is not possible with known gas springs so that additional springs, such as rubber springs or buffers, must be used to increase the gas spring hardness at the end of the stroke.

It is therefore an object of the invention to eliminate these drawbacks and to provide an improved gas spring. According to the invention, this object is realized by varying the spring characteristic as a function of the stroke. Hence, a gas spring according to the invention will adapt itself automatically to the changing requirements, particularly with regard to the said increase in the hardness of the spring at the end of the stroke.

In a preferred embodiment, the piston rod has a changing cross section, and more particularly, a cross section increasing axially towards the piston rod end located outside the cylinder. The piston rod may have a section with constant small cross section and another section with constant large cross section. Preferably, the piston rod consists of two parts, namely a displacement rod and a sleeve surrounding the same, both parts passing from the cylinder in sealed relationship therewith.

In another preferred embodiment, a stop member is firmly connected with the displacement rod, whereby, when the displacement rod enters the cylinder and starting from a certain point on the overall stroke, the sleeve is made to enter the cylinder. Conveniently, the sleeve is sealed in relation to the piston rod outlet end of the cylinder and in relation to the displacement rod. A sliding seal, firmly connected with the sleeve, may serve to seal the displacement rod against the sleeve; this sliding seal may be mounted outside the cylinder.

In yet another preferred embodiment, the gas spring according to the invention acts simultaneously as a shock absorber and comprises an outer cylinder, arranged concentrically to the said cylinder, as known per se. The interior of the inner cylinder is here completely filled with fluid, whilst the annular space, formed between the two cylinders is divided by a sliding piston seal into two chambers, of which one is filled with fluid and the other with pressure gas. The fluid-filled interior of the inner cylinder communicates through an overflow passage with the liquid filled portion of the annular space. The piston rod is connected to a piston provided with restricted flow passages for the fluid.

Further advantages, features and details of the invention will become apparent from the following description of a preferred embodiment, serving simultaneously as a shock absorber, form the accompanying drawing and from the appended claims. In the drawing:

FIG. 1 is an axial cross section, showing a partial stroke, wherein the sleeve has not yet entered the interior of the cylinder;

FIG. 2 is an axial cross section at a stage of the stroke corresponding to the start of the entering movement of the sleeve into the cylinder; and FIG. 3 shows the spring characteristic of the gas spring illustrated in FIGS. 1 and 2.

A piston rod 1 with a piston 2 is mounted axially displaceably in a cylinder 3. The piston 2 has, as well known in the art, restricting flow passages 4 for a fluid provided inside the cylinder 3; these flow passages cooperate with sprung valve plates 5 and make thus possible a damping as a function of the velocity and direction. An outer cylinder 6 is mounted concentrically to the cylinder 3. An annular chamber formed between the cylinder 3 and 6 is filled partly with pressure gas and partly with fluid, the chambers being separated by a sliding piston seal 7, and sealed against each other. The part of the annular chamber filled with fluid, communicates through an overflow orifice, not shown, with the interior of the cylinder 3 which does not contain the piston rod.

The sliding piston is provided with two ring seals 7a and 7b, consisting preferably of O-rings, producing by very simple means a long-life, highly efficient seal, because each ring seal has to seal only against one surface, i.e., the ring seal 7a seals against the inner surface of the outer cylinder 6, whilst the ring seal 7b provides a seal against the outer surface of the inner cylinder 3.

In the embodiment shown in the drawing, the piston rod 1 consists of two parts, namely a displacement rod 8 and a sleeve 9 surrounding the same. The displacement rod 8, carrying the piston 2, is sealed in relation to the sleeve 9 by means of a sliding seal 10 connected with the sleeve 9. The sliding seal 10 consists of a first ring screwed onto the sleeve 9, and connected with a second ring 12. An annular sliding seal 13 is mounted in a recess of the ring 12 and forms the actual sealing element, sealing the displacement rod 8 in relation of the seal 9.

Since the screwed joint between the sleeve 9 and the ring 11 cannot prevent the passage of the pressurized fluid, further seals 13a and 13b are provided, which are fitted into the ring 11 ans sealed against the ring 12 and against the sleeve 9.

The sleeve 9 is sealed in relation to the piston rod outlet ends of the cylinders 3 and 6. To this end there is provided a ring 14, partly fitted into the end of the cylinder 3 and sealing against the inner surface of the cylinder 3 (seal 15) and against a further ring 16 (seal 17) which closes the piston rod outlet end of the outer cylinder 6 towards the outside. The ring 16 is sealed against the inner surface of the outer cylinder 6 by a seal 18. A sliding ring seal 19 is fitted in a groove of the ring 16 and seals against the outer surface of the sleeve 9.

A circlip or spring ring 20 is mounted on the end of the sleeve 9 located within the interior of the cylinder 3, serving as a limit stop and defining the outward movement of the sleeve 9.

Outside the interior of both cylinders 3 and 6 the displacement rod 8 carries a disc 21, shown in the drawing to the right of the seal 10, serving as a stop and for fitting the sleeve 9 as described in detail further below.

The two ends of the cylinders 3 and 6, remote from the piston rod outlet end are sealed and closed by cylindrical plugs 22 and 23. The plug 23 has screwed thereinto a mounting eyelet 24, forming one of the two mounting points of the gas spring. Mounting eyelet 25 on the other side is connected with the displacement rod 8.

The preferred embodiment of a gas spring with combined shock absorption, described above and shown in the drawing, operates as follows:

At the start of the stroke, i.e., at the start of the inward movement of the piston rod 1 into the inner cylinder 3, the displacement volume of the piston rod 1, effective for the springing, is provided only by the displacement rod 8. This results in a certain spring characteristic as a function of the volume and pressure of the gas charge. During the progressive inward movement of the displacement rod 8, in the position shown in FIG. 2, the annular disc 21, serving as the limit stop abuts on the seal 10 so that during the further inward movement the seal 10 is moved towards the left as shown in the drawing and the sleeve 9 enters the interior of the cylinder 3. This causes the effective displacement volume of the piston rod 1 to be increased, which is now being determined by the cross section of the displacement rod 8 and the sleeve 9. This increase in the volume results in a change of the spring characteristic, i.e., in a hardening of the spring, as may be seen from the diagram in FIG. 3, indicated by the steep rise of the force at a stroke of 150. During the further inward movement of the piston rod 1, the ring 11 of the seal finally comes to rest on the end of the cylinder 6 and therefrom, ring 16 arranged therein. This terminates the inward movement. The axial distance between the seal 10 and the piston rod outlet end of the outer cylinder 6, related to the sleeve 9 in the extended position, is so adjusted relative to the axial distance of the disc 21 serving as a stop and the axial length of the displacement rod 8 that the seal 10 comes to rest at the right end of the outer cylinder 6 before the left end of the displacement rod 8 abuts against the left plug 22.

When the pressure acting on the piston rod 1 in the zone of the right-hand suspension point is released, the curve of FIG. 3 is passed through from the right to the left. During this, the pressure of the pressure gas change, which is equal to the fluid pressure apart from negligible pressure loses, moves the displacement rod 8 and sleeve 9 synchronously from the interior of the cylinder 3 until the spring ring 20 comes to rest against the left edge of the ring 14. This terminates the outward movement of the sleeve 9 and only the displacement rod 8 is further expelled from the cylinder 3 until it comes to rest against the left end of the sleeve 9.

It can be seen easily that the gas spring according to the invention has the great advantage that the spring characteristic can be modified as a function of the stroke making possible an adaption of the spring to different load conditions. In addition this change in the spring characteristic as a function of the stroke is achieved in a very simple manner by means of a change in the cross section of the piston rod in the axial direction.

The preferred embodiment of the gas spring shown and described relates to an arrangement, used preferably in the construction of motor cars and for this reason the stroke-dependent modification of the spring characteristic has been so chosen that the desired hardening of the spring is obtained towards the end of the stroke. Obviously different modifications of the spring characteristics can be chosen for other loads and applications and this may be achieved simply by a corresponding change in the axial cross section of the piston rod. Since, as already mentioned, this embodiment relates to a gas spring intended for automotive engineering, the spring is combined with a shock absorber, resulting in a particularly convenient and compact arrangement. However, also other arrangements can be used, of which the simplest construction comprises a cylinder filled with pressure gas, without fluid, and a piston rod with axially varying displacement volume adapted to be axially displaced in the cylinder. Moreover, the embodiment shown may be simplified in that way that only a single cylinder is provided instead of two concentric cylinders, wherein this cylinder contains both a pressure gas charge and a fluid charge and these two charges a separated from each other by a sliding piston seal, as well known in the art.

As a modification of the embodiment shown, relating to a gas spring acting under compression, the modification of the spring characteristic as a function of the stroke may, according to the invention, also be applied to a gas spring working under tension.

A gas spring according to the invention is not limited to the particularly advantageous use in automotive construction and may be used for any technical applications in which a change in the damping as a function of the stroke is desirable.

We claim:

1. A gas spring comprising:
   a. at least one cylinder containing a gas under pressure;
   b. a piston rod assembly arranged for axial displacement in the cylinder consisting of;
      1. a displacement rod, and
      2. a sleeve surrounding the displacement rod said rod being axially moveable in relation to the sleeve and both the rod and the sleeve extending through one end of said cylinder and having sealing means in relation thereto;
   c. stop means connected to the displacement rod to cause introduction of the sleeve into the cylinder after a predetermined axial movement of the displacement rod so that the displacement rod cross section changes as a function of the stroke.

2. A gas spring as set forth in claim 1, wherein two seals are provided, of which one seals the inner rod against the sleeve, and the other seals the sleeve against the end of the cylinder.

3. A gas spring as set forth in claim 2, wherein the seal between the inner rod and the sleeve is a sliding ring seal located outside the cylinder and firmly connected with the sleeve.

4. A gas spring as set forth in claim 1, wherein a stop, limiting the outward movement of the sleeve from the cylinder is arranged on the end of the sleeve within the cylinder.

5. A gas spring as set forth in claim 3, wherein a second outer cylinder is arranged concentrically to the said cylinder and in spaced relationship therefrom, wherein the annular space formed between the two cylinders is partly filled with pressure gas and partly with pressure fluid and the interior of the inner cylinder is completely filled with fluid and communicates through an overflow with the fluid-filled portion of the annular chamber.

6. A gas spring as set forth in claim 1, including a piston which is firmly connected with the displacement rod and equipped with restricting passages for the pressure fluid.

7. A gas spring as set forth in 5, including sliding ring seal, separating and sealing the pressure fluid and the pressure gas in the annular chamber between the two cylinders from and against each other and having two ring seals of which one seals against the inner wall of the outer cylinder and the other against the outer wall of the inner cylinder.